United States Patent
Nowak et al.

[15] 3,674,893
[45] July 4, 1972

[54] THERMOSETTABLE RESINS CONTAINING VINYLESTER RESIN, POLYDIENE RUBBERS AND VINYL MONOMERS

[72] Inventors: Robert M. Nowak; Thomas O. Ginter, both of Midland, Mich.

[73] Assignee: The Dow Chemical Company, Midland, Mich.

[22] Filed: March 9, 1970

[21] Appl. No.: 17,947

Related U.S. Application Data

[63] Continuation-in-part of Ser. No. 812,326, April 1, 1969, abandoned.

[52] U.S. Cl. ..........260/836, 260/23 EP, 260/23.7 R, 260/37 EP, 260/41.5 R, 260/78.5 BB, 260/830 TW, 260/835, 260/837 R
[51] Int. Cl. .................................................C08g 45/04
[58] Field of Search ......................260/862, 4, 836, 837

[56] References Cited

UNITED STATES PATENTS

| | | | |
|---|---|---|---|
| 3,420,914 | 1/1969 | May | 260/837 |
| 3,535,403 | 10/1970 | Holub | 260/837 |
| 3,301,743 | 1/1967 | Fekete | 260/837 |

*Primary Examiner*—Paul Lieberman
*Attorney*—Griswold & Burdick, Albin R. Lindstrom and H. L. Aamoth

[57] ABSTRACT

Stable compositions are prepared from a mixture of an unsaturated vinyl ester thermosettable resin containing a copolymerizable monomer and an unsaturated polydiene rubber having an inherent viscosity between about 0.30 to 1.2 deciliters/gram. Thermoset articles reinforced with glass fibers, etc. prepared from said composition have improved properties such as impact strength, surface smoothness and paintability as well as good mechanical properties such as tensile strength and modulus. The compositions are noteworthy in their ability to accept pigments uniformly without producing mottling even with dark pigments.

19 Claims, No Drawings

THERMOSETTABLE RESINS CONTAINING VINYLESTER RESIN, POLYDIENE RUBBERS AND VINYL MONOMERS

REFERENCES

This application is a continuation-in-part of our copending application Ser. No. 812,326 filed on Apr. 1, 1969, and now abandoned.

BACKGROUND OF THE INVENTION

The subject matter of this invention broadly relates to reinforced plastics having impact resistance, uniformity of pigmentation, smooth surfaces (low profile) and good paintability. More specifically, it relates to thermosettable compositions and thermoset articles prepared therefrom which contain an intimate admixture of certain unsaturated polydiene rubbers and unsaturated thermosettable resins.

Brittleness in reinforced plastics is a serious problem and a practical deterrent to their use in the manufacture of a variety of articles, such as car fenders, etc. where the highest possible impact resistance is essential. Currently, some manufacturer specifications for reverse impact properties make it difficult for most commercially available resins to be approved for such uses. In addition other factors are of prime importance, (1) the resin should be capable of providing the smoothest possible surface to minimize the costs of surface preparation (sanding, etc.) for painting, (2) paint should adhere well to the molded article and (3) the resin should be capable of producing uniformly pigmented (non-mottled appearance) articles.

Attempts have been made to improve the surface properties (low profile characteristics) by incorporating into a resin such as an unsaturated polyester, a thermoplastic such as polymethyl methacrylate or polystyrene. Improvements in surface smoothness may be obtained, but paintability and/or impact strength are not improved. In addition such resins pigment poorly and at best only light pastel colors have been possible. Attempts to prepare dark, molded colors have not been successful.

U.S. Pat. No. 3,231,634 proposes to add small amounts of a low molecular weight polydiene to an unsaturated polyester resin to reduce pitting, cracking and crazing of the molded article. However, such compositions do not reduce cracking and crazing any better than the addition of an equivalent amount of polystyrene or polymethyl methacrylate. None of these additives overcome the brittleness of the reinforced plastics part as measured by the reverse impact test.

This invention relates toe resin compositions which provide improvements in one or more of the properties of impact strength, stability, paintability, surface smoothness and uniformity of pigmentation in reinforced molded articles prepared therefrom.

SUMMARY OF THE INVENTION

Accordingly, the improvements and benefits of this invention are obtained by preparing an intimate mixture of (1) an unsaturated resin which comprises from about 25 to 70 weight percent of an unsaturated polyester or vinyl ester resin and from about 75 to 30 weight percent of a copolymerizable monomer with (2) an unsaturated polydiene rubber in the proportions of about 5 to 15 weight percent of said polydiene and about 95 to 85 weight percent of said unsaturated resin.

Essential to the improved stability of the mixtures of this invention is the selection of polydiene rubbers having an inherent viscosity of about 0.3 to 1.2 deciliters/gram. Further stability may be obtained by incorporating inert fillers such as kaolin clay into said mixtures and, importantly, the addition of such inert fillers to the mixture allows the viscosity range of said polydiene rubbers to be extended to about 0.3 to 2.0 deciliters/gram.

The compositions are combined with reinforcing materials and molded (cured) into articles exhibiting one or more of the improved properties.

DETAILED DESCRIPTION OF THE INVENTION

Different uses place different demands on the physical and other properties of materials, especially plastics, but frequently changes which might be made to improve one property are made at the expense of other properties. Therefore it was quite unexpected and surprising that the addition of certain polydiene rubbers to unsaturated thermosettable resins provides improvements in impact strength, surface smoothness, uniformity of pigmentation and paintability of reinforced plastic articles while maintaining good physical properties.

By polydiene rubbers it is meant to include herein homopolymers and copolymers of conjugated diene monomers such as butadiene. It is further contemplated within this definition to include polymers containing at least about 30 weight percent of diene monomer with the balance comprising at least one other copolymerizable monomer such as styrene or acrylonitrile. It is also meant to include random, graft and block polymers of which a wide variety are commercially available or readily prepared by known polymerization methods.

While polydiene rubbers with as little as 30 weight percent of a diene monomer provide improvements according to this invention better impact resistance is found when the diene monomer constitutes at least about 40 weight percent of the polymer and polymers at or above this level are preferred for this invention.

Conjugated diene monomers include butadiene, isoprene, chloroprene, the various halo and lower alkyl substituted derivatives thereof and like monomers. Mixtures of said diene monomers are frequently used to impart certain desired properties to the polydiene rubbers. Polybutadiene is a preferred polydiene.

Copolymerizable monomers useful with said diene monomers include nitrile monomers such as acrylonitrile, methacrylonitrile and the like and alkenyl aromatic monomers such as styrene, $\alpha$-methyl styrene, vinyl toluene, the halo and alkyl substituted styrenes such as chlorostyrene or t-butyl styrene. Preferred copolymers include styrene-butadiene copolymers and especially block copolymers thereof.

The unsaturated polydiene rubbers of this invention may be prepared by a variety of well known procedures, and since this invention is concerned with the utilization of said rubbers and not their preparation, no detailed description thereof is needed. Many textbooks and patents are readily available which can be consulted for such preparative methods, such as the chapter on butadiene polymers and copolymers by W. Saltman in "Encyclopedia of Polymer Science and Technology," Vol. 2, Interscience Publishers, 1965.

Another important feature of this invention relates to the stability of the compositions. Mixtures such as those in U.S. Pat. No. 3,231,634 are difficult to maintain as a uniform mixture without phase separation occurring before the article can be molded. According to this invention compositions of improved stability may be prepared which may be readily molded without phase separation occurring by utilizing therein a polydiene rubber having an inherent viscosity of about 0.3 to 1.2 deciliters/gram or a molecular weight of at least about 15,000 to 20,000.

It has been found that improvement in impact resistance appears to be related to molecular weight of the polydiene rubber. Consequently higher molecular weight polydiene rubbers when used at the lowest concentration show greater improvement in impact resistance than the lower molecular weights. Accordingly it is preferred to use polydiene rubbers having a viscosity of at least about 0.5 deciliters/gram.

Advantageously it has been found that the viscosity range can be extended upward to about 2 deciliters/gram if the system also contains at least about 15 parts of an inert filler such as clay and the like per 100 parts of resin and rubber. This is of particular significance because thermosettable resin systems are usually formulated with such fillers in commercial use in order to impart certain properties such as weatherability, etc. and for reason of economics.

Inherent viscosity is defined as follows:

$$\eta\, inh = (2.303 \log_{10} \eta\, r)/(C),$$

where
$\eta\, r = (\eta/\eta)$, and
$\eta$ = time for solvent and
$\eta$ = time for a solution of 0.15 gm of polymer/100 ml of toluene.
C = concentration The viscosity units are in deciliters/gram.

The unsaturated thermosettable resin comprises from 25 to 70 weight percent of an unsaturated polyester or vinyl ester resin and from 75 to 30 weight percent of a copolymerizable monomer.

Generally, in the preparation of suitable polyesters, an ethylenically unsaturated dicarboxylic acid such as maleic acid, fumaric acid, itaconic acid or the like is interesterified with an alkylene glycol or polyalkylene glycol having a molecular weight of about 1,000 to 8,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 2 to 10 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 5 to 15 hours. Polymerization inhibitors such as t-butyl catechol may be advantageously added. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride. Further description of these well known resins is unnecessary herein.

Vinyl ester resins are generally prepared by reacting about equivalent proportions of a polyepoxide resin and an unsaturated monocarboxylic acid wherein

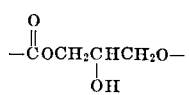

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the above-described resins which contain the characteristic linkages

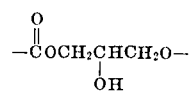

and terminal, polymerizable unsaturated groups, are classified herein as vinyl ester resins. The preparation of vinyl ester resins is fully disclosed in the above patents.

Additionally, it is meant to include within the definition of vinyl ester resins those resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25° to 150° C. is suitable and any of the well known vinyl polymerization inhibitors may be added to prevent polymerization during the reaction.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms.

Useful dicarboxylic acid anhydrides to modify the vinyl ester resin include unsaturated anhydrides such as maleic anhydride, citraconic anhydride, itaconic anhydride, the various substituted maleic anhydrides and the like, as well as a variety of saturated anhydrides such as phthalic anhydride, chlorendic anhydride, tetrabromophthalic anhydride and the like.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, $\alpha$-methyl styrene, vinyl toluene, alkyl substituted styrenes such as t-butyl styrene, etc., halogen substituted styrenes such as chlorostyrene, dichlorostyrene and the like.

The thermosettable resin/polydiene rubber mixtures of this invention, may be readily cured by exposure to ionizing radiation or by admixture of free radical yielding catalysts such as the well known peroxides, persulfates and the like. With catalysts the cure may be accelerated by heating up to 150° C.

or higher and also, if desired, by the addition of accelerating agents.

Reverse impact strength, uniform pigmentation, smooth surface and good paintability are all important characteristics which may be obtained with the compositions of this invention. Reverse impact is measured by subjecting a 5-inch diameter molded specimen to the impact of a ½-pound steel ball, 1 ½ inches in diameter, dropped from varying heights, in inches. The panel passes if there is no sign of cracking on the reverse side of the specimen after impact. The higher the height that passes the better the reverse impact strength. Desirably for certain automotive uses the specimen should pass 8 inches of reverse impact, but for other purposes a lesser impact resistance is of value.

Surface smoothness can be measured by a Micro Recorder (manufactured by Micrometrical Manufacturing Co., Ann Arbor, Michigan, Type RAE Recorder, Model S3) which in essence utilizes a small scribe to trace the surface contour and then records the surface "profile". From this tracing or record, the "profile" can be determined as the difference between the "peaks" and "valleys" in microinches. By low profile herein is meant a surface profile of about 300 microinch or less, measured as above; and a low profile resin is one which upon molding with glass fiber mat at a 25–35 percent glass level produces a smooth surface of less than about 300 microinch over an average 3-inch to 4-inch span.

Paintability may be evaluated by a water soak test in which the molded part is painted with an automotive enamel and then immersed for 240 hours in a water bath at 90° F. Any imperfections, usually in the form of paint blisters, constitutes failure. Uniformity of pigmentation is evaluated visually nonuniform pigmentation is readily discernible to a skilled artisan.

The following non-limiting examples are presented to further illustrate the invention and the advantages thereof. All parts and percentages are by weight unless otherwise specified.

EXAMPLE 1

Resin compositions were prepared using a variety of unsaturated polydiene rubbers and a commercially available polyester resin (P-340, Rohm and Haas) which is proposed for and especially designed to produce a smooth molded surface. The polyester was essentially a 1:1 maleic anhydride/propylene glycol resin with some dipropylene glycol units as indicated by nuclear magnetic resonance analysis. For comparison, several thermoplastic resins were substituted for said rubbers.

The resin compositions were prepared to contain polyester, styrene and the additive in the respective proportions of 45/46/9 except for a control run which omitted the additive and where the ratio of polyester to styrene was 54/46. A molding composition was then prepared by mixing a hydrated kaolin clay in the proportion of 60 parts resin composition and 40 parts clay. To this was then added about 1 percent t-butyl peroctoate catalyst and 0.5 percent of a proprietary mold release agent (Zelec UN), both based on resin composition weight. This mixture was then molded with 30 percent continuous glass mat and a 20 mil veil glass mat on one side for 1–2 minutes at 150° C. and about 300 psi. The results are shown in Table I.

TABLE I

| Additive | Reverse impact, inches | Surface, micro inches |
|---|---|---|
| A None | <3 | 300 |
| B Polymethyl methacrylate | <4 | 175 |
| C Polyvinyl chloride | 4 | 750 |
| D Polystyrene | 5 | 175 |
| E Polystyrene [1] | (2) | 220 |
| F Polybutadiene [a] | 10 | 145 |
| G Styrene/butadiene 48/52, random [b] | 7 | 175 |
| H Styrene/butadiene 25/75, block [c] | 6 | 145 |
| I Styrene/butadiene 25/75, random [d] | 7 | 145 |
| J Styrene/butadiene 60/40, block | 8 | 240 |
| K Same as J [1] | 15+ | 140 |
| L Styrene/butadiene 70/30, block | 6 | 240 |
| M Same as L [1] | 6 | 190 |
| N S/B/S 20/60/20, block [g] | 10 | 180 |
| O S/B/S 25/50/25, block | 10 | 160 |
| P B/S/B 33/33/33, block | <5 | 240 |
| Q B/S/B (similar to P) | 5 | — |
| R B/S/B (same as Q) [1] | 10 | 284 |
| S Acrylonitrile/butadiene 20/80, random [e] | ≥10 | 180 |
| T Acrylonitrile/butadiene 32/68, random [f] | ≥10 | 150 |

[1] Polydiene added at 15% level.
[2] Failed 4.
[a] Phillips Solprene 203.
[b] Solprene 303 (about 10% block).
[c] Solprene 1205.
[d] Solprene 1206.
[e] Goodyear N 902.
[f] Goodyear RCG 1592X.
[g] Triblock polymer where S=styrene and B=butadiene.

Even though this polyester resin was designed to give smooth surfaces, the unsaturated polydiene rubbers gave as good or better surfaces than the thermoplastic additives and in addition gave significant improvements in reverse impact. All the rubbers used herein had an inherent viscosity within the range of 0.3 to 2.0 deciliters/gram.

EXAMPLE 2

A more general purpose isophthalic polyester resin was used in tests similar to that of Example 1. The resin was prepared with a mole ratio of isophthalic to maleic anhydride of 3 to 4 and the glycol was predominantly diethylene glycol with some ethylene glycol. Table II summarizes the compositions and results.

With this resin (a more flexible, lower heat distortion resin), the initial surface was poorer than the previous polyester resin often having profiles as high as 2,500 but the initial impact was better. Even so, the styrene/butadiene block copolymer gave significant improvements in both properties and the composition's pigment uniformly when compared to polymethyl methacrylate, for example.

TABLE II

| Additive Type | Wt. percent | Wt. percent of PE | Wt. percent of Styrene | Reverse impact, inches | Surface, micro inches |
|---|---|---|---|---|---|
| None | 0 | 65 | 35 | 6 | >1,000 |
| Do | 0 | 55 | 45 | 4 | >1,000 |
| Polystyrene | 9 | 40 | 51 | 6 | 450 |
| Polymethyl methacrylate | 9 | 40 | 51 | 6 | 775 |
| S/B 40/60, block [a] | 9 | 40 | 51 | 8 | 335 |
| Do | 9 | 40 | [b] 51 | 8 | 450 |
| Polystyrene | 15 | 33 | 52 | 7 | 600 |
| Polymethyl methacrylate | 15 | 33 | 52 | 7 | 825 |
| S/B 40/60, block | 15 | 33 | 52 | >20 | 360 |

[a] Inherent viscosity of 0.7 deciliter/gram.
[b] Monomer is 80/20 monochlorostyrene/styrene.

EXAMPLE 3

Two different vinyl ester resins were also used in tests similar to Example 1. Vinyl ester resin A was prepared by reacting methacrylic acid with a mixture of two polyepoxides, D.E.N. 438 (an epoxy novolac having an epoxide eq. wt. of 175–182) and D.E.R. 331 (a bisphenol A based polyepoxide having an epoxide eq. wt. of 186–192) and then blending with styrene. The finished resin contained 24.02 percent maleic anhydride, 37.7 percent D.E.N. 438, 13.28 percent D.E.R. 331 and 25 percent styrene.

Vinyl ester resin B was prepared by reacting acrylic acid with D.E.R. 331 after which the resin is modified by reaction with maleic anhydride and then blended with styrene. The finished resin contained 42.69 percent D.E.R. 331, 16.17 percent acrylic acid, 11.01 percent maleic anhydride and 30.11 percent styrene. The properties of moldings prepared as in Example 1 with the styrene/butadiene 40/60 block rubber copolymer of Example 2 are shown in Table III.

TABLE III

| resin | wt. percent of resin | rubber | reverse impact, inches | surface micro-inches |
|---|---|---|---|---|
| vinyl ester resin | 100 | 0 | 3 | 500 |
| resin A | 91 | 9 | 20 | 455 |
| resin A | 85 | 15 | 20 | 385 |
| vinyl ester resin B | 91 | 9 | 15 | 125 |
| resin B | 85 | 15 | 15 | 150 |
| resin B | 85 | 15(polystyrene) | 6 | 125 |

EXAMPLE 4

Moldings were prepared as in the previous examples to evaluate the effect of concentration of rubber on impact and surface as well as other mechanical properties. The 40/60 styrene/butadiene block copolymer of Example 2 was used as well as a polybutadiene rubber. The unsaturated polyester (P-340) of Example 1 was used in these tests. Results are shown in Table IV.

The upper limit on rubber composition is more a physical limitation due to viscosity, although mechanical properties also begin to fall off above about 15 percent rubber.

TABLE IV

| Weight percent | | Reverse impact, inches | Surface, micro-inches | Properties* | |
|---|---|---|---|---|---|
| P-340 Resin | Rubber | | | Room temp. | 300° F. |
| 100 | 1 0 | <3 | 300 | 22.9/0.97 | 13.2/0.59 |
| 94 | 1 6 | 4 | 190 | 25.3/1.09 | 16.8/0.80 |
| 91 | 1 9 | 6 | 200 | 24.2/0.99 | 11.2/0.58 |
| 88 | 1 12 | 12 | 170 | 22.0/0.99 | 10.9/0.62 |
| 85 | 1 15 | >20 | 250 | 22.2/0.98 | 12.2/0.64 |
| 97 | 2 3 | 4 | 440 | | |
| 94 | 2 6 | 5 | 300 | | |
| 91 | 2 9 | 10 | 200 | | |
| 91 | 3 9 | <4 | 175 | 25.1/1.22 | 10.8/0.65 |

1 S/B block.
2 Polybutadiene.
3 Polymethylmethacrylate.
*Flexural strength×10³ p.s.i./flexural modulus×10⁻⁶ p.s.i.

EXAMPLE 5

Both stability and molded properties are dependent on the inherent viscosity of the unsaturated polydiene rubber added. Rubbers with varying viscosity were mixed with an unsaturated polyester resin (P-340) and styrene in the proportions of about 45 parts of resin/46 parts of styrene/9 parts of rubber and stability of the mixtures observed.

| rubber | inherent visc., deciliters/gm | stability |
|---|---|---|
| Polybutadiene | 1.9 | phase separated |
| Polybutadiene | 0.6 | stable |
| 40/60 S/B block | 1.3 | phase separated |
| 40/60 S/B block | 0.5 | stable |
| acrylonitrile/butadiene* 32/68, random | 0.84 | stable |

*Goodyear RCG 1592X

When clay is added to the system phase separation is inhibited and polydiene rubbers having viscosities as high as about 2 deciliters/gram may be used. However a range of about 0.3 to 1.2 is preferred.

The effect of viscosity on reverse impact was also determined at a 9 percent level of rubber admixed with 46 percent styrene and 45 percent of P-340 polyester resin. The mixture was then combined with clay and glass fibers and molded as before.

| rubber | inherent visc., deciliters/gm | approx. mol. wt. | reverse impact, inches |
|---|---|---|---|
| 25/75 S/B copolymer | 0.17 | <5,000 | <4 |
| 25/75 S/B copolymer | 0.24 | <10,000 | <4 |
| 25/75 S/B copolymer | 1.5 | | 7 |
| Hycar CTBN [a] | 0.18 | 2,000 | <4 |
| Ricon 100 [b] | 0.1 | ≈2,000 | <4 |
| Ricon 150 [c] | 0.1 | ≈2,000 | <4 |
| Polybutadiene | 1.9 | ≈190,000 | 10 |
| Polybutadiene | 0.6 | ≈39,000 | 7 |
| 40/60 S/B block copolymer | 0.5 | >15,000 | 8 | a) carboxyl terminated 80/20 polybutadiene/acrylonitrile
b) formerly called Buton 100, an 80/20 B/S copolymer
c) formerly called Buton 150, a polybutadiene Rubbers which have an inherent viscosity below about 0.3 deciliters per gram phase separate rapidly even in clay filled systems and give rise to an undesirable effect called mold scum. After a mold has been used one to three times with an unstable system, a polymeric layer builds upon the die and this layer or scum makes part removal very difficult and causes a poor surface finish. Three different rubbers having a viscosity of 0.14 to 0.18 deciliters/gram were all found to produce a very bad scum condition while other rubbers having viscosities of 0.5 to 0.94 did not.

EXAMPLE 6

Paintability, as determined by the water soak test, is also superior when a polydiene rubber is used in place of polymethyl methacrylate. Both additives were tested at a 9 percent level with 46 percent of styrene and 45 percent of P-340 resin. Clay and glass filled moldings were prepared as in Example 1 and tested.

| additive | reverse impact, inches | properties at 300°F | paint soak test |
|---|---|---|---|
| polymethyl methacrylate | 3 | 10.8/0.65 | failed |
| S/B 40/60, block | 9 | 15.1/0.80 | passed |

The block copolymer was superior to polymethyl methacrylate in all three property areas.

Considerable research effort has been spent recently to develop low profile molding resins (smooth surfaces) but the present commercial resin systems which produce a low profile are notoriously poor in accepting pigments, especially dark pigments and frequently have low impact resistance. Polystyrene and polymethacrylate are the two most commonly used additives for low profile but they do not solve the pigmentation problem. The compositions of this invention have the additional and unexpected advantage of producing uniformly pigmented molded articles.

The benefits and advantages of the compositions of this invention are obtained without adversely affecting the mechanical properties such as flexural strength and modulus. As already indicated, the compositions may be combined with a variety of inert fillers such as clay, silica, $CaCO_3$, and other known fillers and with reinforcing additives such as glass fibers, asbestos, thermoplastic fibers such as nylon, polyvinyl alcohol and the like. The proportions of clay and fillers will vary widely depending on the thermosettable resin, polydiene rubber, viscosity of the mixture, ultimate properties desired in the molded part, etc. and are easily determined with little experimentation.

The properties of the compositions herein are especially valuable in the preparation of reinforced molded articles where high reverse impact strength is a prime property such as in the molding of automotive body and other parts, but the utility is not limited to this one area and includes many other areas such as construction materials, pipe, furniture, boats, and like areas. The compositions are of general utility in all the areas where unsaturated polyester and vinyl ester resins have been used.

What is claimed is:

1. A stable, thermosettable resin composition suitable for preparing reinforced plastic articles having improved impact strength, surface smoothness, uniformity of pigmentation and paintability which comprises
   a. an unsaturated resin comprising from about 25 to 70 weight percent of an unsaturated vinyl ester resin prepared by reacting about equivalent amounts of an unsaturated monocarboxylic acid with a polyepoxide having more than one epoxide group per molecule and from 75 to 30 weight percent of a copolymerizable monomer; and
   b. an unsaturated rubbery polydiene having a molecular weight of at least 15,000 and containing in polymerized form at least about 30 weight percent of a conjugated diene monomer and from zero to about 70 percent of at least one other copolymerizable monomer, and having an inherent viscosity of about 0.3 to 1.2 deciliters/gram; wherein said composition contains about 5 to 15 weight percent of said polydiene and from about 95 to 85 weight percent of said unsaturated resin.

2. The composition of claim 1 wherein said polydiene rubber is a homopolymer of an unsaturated diene monomer or a polymer of two or more unsaturated diene monomers.

3. The composition of claim 2 wherein said rubber is polybutadiene.

4. The composition of claim 1 wherein said polymer contains at least 40 weight percent of said diene monomer.

5. The composition of claim 1 wherein said polymer is a styrene-butadiene or a butadiene-acrylonitrile polymer.

6. The composition of claim 1 wherein said copolymerizable monomer is a nitrile monomer or an alkenyl aromatic monomer.

7. The composition of claim 1 wherein said polydiene rubber has an inherrent viscosity of about 0.5 to 1.2 deciliters/gram.

8. The composition of claim 1 further comprising at least 15 parts of an inert filler per 100 parts of components (a) and (b).

9. The composition of claim 1 further comprising an inert reinforcing material.

10. A thermoset resin prepared by curing the composition of claim 1.

11. A thermoset resin prepared by curing the composition of claim 2.

12. A thermoset resin prepared by curing the composition of claim 3.

13. A thermoset resin prepared by curing the composition of claim 4.

14. A thermoset resin prepared by curing the composition of claim 5.

15. A thermoset resin prepared by curing the composition of claim 6.

16. A thermoset resin prepared by curing the composition of claim 7.

17. A thermoset resin prepared by curing the composition of claim 8.

18. A thermoset resin prepared by curing the composition of claim 9.

19. The composition of claim 1 wherein said vinyl ester is further reacted with an unsaturated dicarboxylic acid anhydride.

20. A stable thermosettable resin composition suitable for preparing reinforced plastic articles having improved impact strength, surface smoothness, uniformity of pigmentation and paintability which comprises
   a. an unsaturated resin comprising from about 25 to 70 weight percent of an unsaturated vinyl ester resin prepared by reacting about equivalent amounts of an unsaturated monocarboxylic acid with a polyepoxide having more than one epoxide group per molecule and from 75 to 30 weight percent of a copolymerizable monomer; and
   b. an unsaturated polyidene rubber containing at least about 30 weight percent of a conjugated diene monomer and the balance to make 100 percent of at least one other copolymerizable monomer and having an inherent viscosity of about 0.3 to 2.0 deciliters/gram; and
   c. at least 15 parts of an inert filler per 100 parts of components (a) and (b); wherein the weight ration of (b) and (a) ranges from about 5/95 to 15/85.

* * * * *

PO-1050
(5/69)

UNITED STATES PATENT OFFICE
CERTIFICATE OF CORRECTION

Patent No. 3,674,893           Dated    4 July 1972

Inventor(s)    Robert M. Nowak and Thomas O. Ginter

It is certified that error appears in the above-identified patent and that said Letters Patent are hereby corrected as shown below:

Column 10, Lines 30-47, delete Claim 20.

Signed and sealed this 23rd day of January 1973.

(SEAL)
Attest:

EDWARD M. FLETCHER, JR.
Attesting Officer

ROBERT GOTTSCHALK
Commissioner of Patents